United States Patent [19]

Uda et al.

[11] Patent Number: 4,515,915

[45] Date of Patent: May 7, 1985

[54] POLYAMIDE ACID COMPOSITION FOR PREPARING POLYIMIDE

[75] Inventors: Junji Uda; Tsuneo Yamamoto, both of Otsu; Takumi Kosugi, Kobe, all of Japan

[73] Assignee: Kanegafuchi Kagaku Kogyo Kabushiki Kaisha, Osaka, Japan

[21] Appl. No.: 570,313

[22] Filed: Jan. 13, 1984

[30] Foreign Application Priority Data

Jan. 14, 1983 [JP] Japan ................................ 58-4395

[51] Int. Cl.$^3$ ............................................. C08L 79/08
[52] U.S. Cl. ........................................ 524/87; 524/86; 524/99; 524/104; 524/600
[58] Field of Search .................... 524/600, 86, 87, 99, 524/104

[56] References Cited

U.S. PATENT DOCUMENTS

| 3,179,630 | 4/1965 | Endrey et al. | 260/78 |
| 3,179,632 | 4/1965 | Hendrix et al. | 260/78 |
| 3,179,634 | 4/1965 | Edward et al. | 260/78 |
| 3,410,826 | 11/1968 | Endrey et al. | 260/47 |
| 3,541,036 | 11/1970 | Libackyi | 524/357 |
| 3,898,199 | 8/1975 | Biensan et al. | 524/357 |
| 4,183,835 | 1/1980 | Yamaguchi et al. | 524/600 |
| 4,454,276 | 6/1984 | Uda et al. | 524/600 |

Primary Examiner—Lester L. Lee
Attorney, Agent, or Firm—Armstrong, Nikaido, Marmelstein & Kubovcik

[57] ABSTRACT

A polyamide acid composition for preparing a polyimide which is improved in the stability in a form of solution and can extend the pot life of the composition comprising a solution of a polyamide acid in an organic solvent, the polyamide acid being a precursor of the polyimide, and an N-substituted heterocyclic compound as a chemical treating agent which can lower a rate of conversion of the polyamide acid to the polyimide. The pot life can be extremely extended to give the composition an enough flowability for a long time without reducing the excellent properties such as a heat resistance of the obtained polyimide.

3 Claims, No Drawings

POLYAMIDE ACID COMPOSITION FOR PREPARING POLYIMIDE

BACKGROUND OF THE INVENTION

The present invention relates to a polyamide acid composition for preparing a polyimide, and more particularly relates to a polyamide acid composition which is improved in stability when a polyimide product is molded from a solution of a polyamide acid in an organic solvent (hereinafter referred to as "polyamide acid solution").

A polyimide has an excellent heat resistance and it is difficult to mold the polyimide itself due to its excellent heat resistance. Therefore, the polyimide product is, in general, prepared by molding a polyamide acid solution which is a precursor of the polyimide, and converting the polyamide acid to the polyimide.

As a process for converting the polyamide acid to the polyimide there are known (A) a process by evaporating a solvent in the polyamide solution by heating, and at the same time thermally converting the polyamide acid to the polyimide; and (B) a process by chemically converting the polyamide acid to the polyimide with chemical treating agent consisting of a dehydrating agent and a catalyst.

In the process (B), there are known two processes, that is, (B-1) a process by molding a polyamide acid solution, and then immersing into a converting bath prepared with a chemical treating agent; and (B-2) a process by molding a homogeneous admixture of a polyamide acid solution and a chemical treating agent.

These processes have, however, the following defects. As to the process (A), the heating should be carried out quite gradually in order to avoid generation of voids in the molding product, and water which is yielded during the conversion of the polyamide acid to the polyimide causes hydrolysis of the obtained polyimide to make characteristic properties of the polyimide reduce. As to the process (B-1), it takes a long time to convert the polyamide acid to the polyimide, and a degree of the conversion in the surface of the molding and that of the interior are not uniform. On the other hand, the process (B-2) does not have such defects as those in the processes (A) and (B-1). Therefore, the process (B-2) is superior in producibility and gives excellent characteristic properties of the molding. In the process (B-2), however, the conversion of the polyamide acid to the polyimide is drastically accelerated immediately after the chemical treating agents are added to the polyamide acid solution. As a result, the polyamide acid is gelled in a short time. Therefore, in case of employing the process (B-2), the molding operation, particularly continuous molding operation in preparation of film, is difficult and any uniform product cannot be obtained because the pot life of the polyamide acid composition is very short.

When the pot life is shorter than the time of period for molding operation, the pot life can be extended by altering an employed amounts of chemical treating agent. In that case, however, the producibility is lowered because a rate of conversion is lowered, and properties of the obtained polyimide are inferior to the polyimide prepared by the process (B-2).

In the above-mentioned convertional processes, in order to eliminate such defects, the polyamide acid composition is maintained at a low temperature. As a result, activities of chemical treating agent are reduced.

By such manner, however, flowability of the polyamide acid solution decreases due to increase of the viscosity of the solution by cooling, and it is difficult to maintain the solution at a low temperature due to heat generation by admixing a chemical treating agent to the polyamide acid solution. As a result, enough pot life cannot be obtained. Therefore, the process of cooling also is not an effective treatment.

An object of the present invention is to provide a novel polyamide acid composition which can extend the pot life. According to the present invention, the pot life of the polyamide acid composition can be extended at normal temperature while maintaining the advantageous effects of the process (B-2).

According to the present invention, there can be provided a polyamide acid composition for preparing a polyimide comprising a solution of a polyamide acid in an organic solvent which is a precursor of the polyimide and an N-substituted heterocyclic compound of the formula (I):

wherein A is a residue of a heterocyclic ring which constructs an N-heterocyclic ring; X is a member selected from the group consisting of

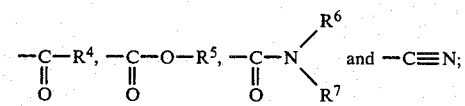

Y is a member selected from the above group, hydrogen atom, an aliphatic group having 1 to 12 carbon atoms or an aromatic group; $R^1$, $R^2$, $R^3$, $R^4$, $R^5$, $R^6$ and $R^7$ are the same or different and each is hydrogen atom, an aliphatic group having 1 to 12 carbon atoms or an aromatic group.

The composition is more stable at normal temperature in a form of solution than that in conventional process (B-2), and by using the composition the pot life can be properly extended and the characteristic properties of an obtained polyimide product are not reduced.

DETAILED EXPLANATION OF THE INVENTION

Examples of the N-substituted heterocyclic compound of the formula (I) are, for instance, an isoquinoline derivative of the formula (II):

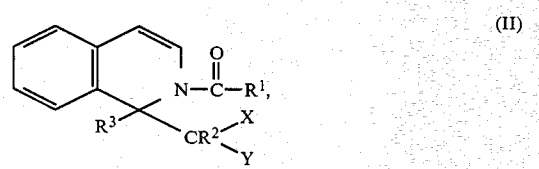

a phthalazine derivative of the formula (III):

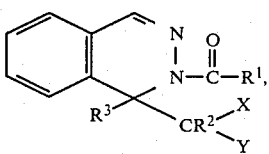

(III)

a 1,6-naphthyridine derivative of the formula (IV):

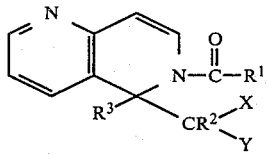

(IV)

wherein X, Y, $R^1$, $R^2$ and $R^3$ are as defined above, and the like.

The derivatives of the formulas (II), (III) and (IV) can be advantageously prepared by reacting isoquinoline, phthalazine and 1,6-naphthyridine, respectively with an acid anhydride of the formula (V):

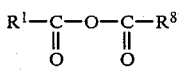

(V)

wherein $R^1$ is as defined above; $R^8$ is the same as or different from $R^1$ and is hydrogen atom, an aliphatic group having 1 to 12 carbon atoms or an aromatic group, and a compound having an active hydrogen of the formula (VI):

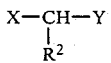

(VI)

wherein X, Y and $R^2$ are as defined above.

Examples of the acid anhydride of the formula (V) are, for instance, acetic anhydride, propionic anhydride, butyric anhydride, benzoic anhydride, and the like. Acetic anhydride is more preferable.

Examples of the compound of the formula (VI) are, for instance, at least one member selected from the group consisting of a compound of the formula (VII):

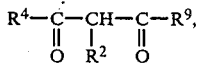

(VII)

a compound of the formula (VIII):

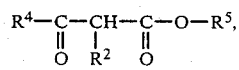

(VIII)

a compound of the formula (IX):

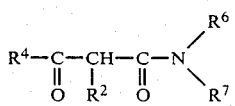

(IX)

and a compound of the formula (X):

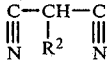

(X)

wherein $R^2$, $R^4$, $R^5$, $R^6$ and $R^7$ are as defined above; $R^9$ is different from $R^4$ and is hydrogen atom, an aliphatic group having 1 to 12 carbon atoms or an aromatic group, and $R^4$ and $R^9$, $R^4$ and $R^5$, $R^4$ and $R^6$ or $R^7$ may be combined together to form a ring.

Examples of the compound of the formula (VII) are, for instance, acetylacetone, 2,4-hexanedione, 2,4-heptanedione, 2,4-octanedione, 3,5-heptanedione, 3,5-octanedione, 3,5-nonanedione, 4,6-nonanedione, 4,6-decanedione, 5,7-undecanedione, 3-methyl-2,4-pentanedione, 3-ethyl-2,4-pentanedione, 3-propyl-2,4-pentanedione, 3-methyl-2,4-hexanedione, 3-ethyl-2,4-hexanedione, 3-propyl-2,4-hexanedione, 3-methyl-2,4-heptanedione, 3-propyl-2,4-heptanedione, 3-methyl-2,4-octanedione, 3-ethyl-2,4-octanedione, 3-propyl-2,4-octanedione, 4-methyl-3,5-heptanedione, 4-ethyl-3,5-heptanedione, 4-propyl-3,5-heptanedione, 4-methyl-3,5-octanedione, 4-ethyl-3,5-octanedione, 4-methyl-3,5-nonanedione, 4-ethyl-3,5-nonanedione, 5-methyl-4,6-nonanedione, 5-ethyl-4,6-nonanedione, 5-methyl-4,6-decanedione, 5-ethyl-4,6-decanedione, 6-methyl-5,7-undecanedione, 6-ethyl-5,7-undecanedione, benzoylacetone, 1,3-diphenyl-1,3-propanedione, and the like.

Examples of the compound of the formula (VIII) are, for instance, methyl acetoacetate, ethyl acetoacetate, propyl acetoacetate, butyl acetoacetate, pentyl acetoacetate, hexyl acetoacetate, heptyl acetoacetate, octyl acetoacetate, phenyl acetoacetate, methyl pentanoat-3-one, ethyl pentanoat-3-one, propyl pentanoat-3-one, butyl pentanoat-3-one, pentyl pentanoat-3-one, hexyl pentanoat-3-one, heptyl pentanoat-3-one, octyl pentanoat-3-one, phenyl pentanoat-3-one, methyl hexanoat-3-one, ethyl hexanoat-3-one, propyl hexanoat-3-one, butyl hexanoat-3-one, pentyl hexanoat-3-one, hexyl hexanoat-3-one, heptyl hexanoat-3-one, octyl hexanoat-3-one, phenyl hexanoat-3-one, methyl heptanoat-3-one, ethyl heptanoat-3-one, propyl heptanoat-3-one, butyl heptanoat-3-one, octyl heptanoat-3-one, phenyl heptanoat-3-one, methyl 2-methylbutanoat-3-one, methyl 2-ethylbutanoat-3-one, methyl 2-propylbutanoat-3-one, ethyl 2-methylbutanoat-3-one, propyl 2-methylbutanoat-3-one, butyl 2-methylbutanoat-3-one, phenyl 2-methylbutanoat-3-one, ethyl 2-ethylbutanoate-3-one, propyl 2-ethylbutanoat-3-one, phenyl 2-ethylbuytanoat-3-one, ethyl 2-propylbutanoat-3-one, propyl 2-propylbutanoat-3-one, phenyl 2-propylbutanoat-3-one, methyl 2-phenylbutanoat-3-one, ethyl 2-phenylbutanoat-3-one, phenyl 2-phenylbutanoat-3-one, methyl 3-phenylpropanoat-3-one, ethyl 3-phenylpropanoat- 3-one, phenyl 3-phenylpropanoat-3-one, methyl 2-methyl-3-phenylpropanoat-3-one, methyl 2-ethyl-3-phenylpropanoat-3-one, ethyl 2-ethyl-3-phenylpropanoat-3-one, ethyl 2-methylpentanoat-3-one, ethyl 2-methylpentanoat-3-one, propyl 2-methylpentanoat-3-one, methyl 2-ethylpentanoat-3-one, ethyl 2-ethylpentanoat-3-one, octyl 2-ethylpentanoat-3-one, phenyl 2-ethylpentanoat-3-one, methyl 2-propylpentanoat-3-one, ethyl 2-propylpentanoat-3-one, propyl 2-propylpentanoat-3-one, octyl 2-propylpentanoat-3-one, phenyl 2-propylpentanoat-3-one, methyl 2-phenylpentanoat-3-one, ethyl 2-phenylpentanoat-3-one, propyl 2-phenylpentanoat-3-one, octyl 2-phenylpentanoat-3-one, phenyl 2-phenylpentanoat-3-one, methyl 2-methylhexanoat-3-one, ethyl 2-methylhexanoat-3-one, propyl 2-methylhexanoat-3-one, octyl 2-methylhexanoat-3-one, phenyl 2-methylhexanoat-3-one, methyl 2-ethylhexanoat-3-one, ethyl 2-ethylhexanoat-3-one, octyl 2-ethylhexanoat-3-one, phenyl 2-ethylhexanoat-3-one, methyl 2-propylhexanoat-3-one, ethyl 2-propylhexanoat-3-one, propyl 2-propylhexanoat-3-one, octyl 2-propylhexanoat-3-one, phenyl 2-propylhexanoat-3-one, methyl 2-phenylhexanoat-3-one, ethyl 2-phenylhexanoat-3-one, propyl 2-phenylhexanoat-3-one, butyl 2-phenylhexanoat-3-one, octyl 2-phenylhexanoat-3-one, phenyl 2-phenylhexanoat-3-one, and the like.

Examples of the compound of the formula (IX) are, for instance, N-methylbutanamid-3-one, N-ethylbutanamid-3-one, N-propylbutanamid-3-one, N-butylbutanamid-3-one, N-octylbutanamid-3-one, N,N-dimethylbutanamid-3-one, N,N-diethylbutanamid-3-one, N,N-dipropylbutanamid-3-one, N,N-dibutylbutanamid-3-one, N,N-dioctylbutanamid-3-one, acetoacetanilide (N-phenylbutanamid-3-one), acetoacetotoluidide, N-methylacetoacetanilide, N,N-diphenylbutanamid-3-one, N-methylpentanamid-3-one, N-ethylpentanamid-3-one, N-propylpentanamid-3-one, N-octylpentanamid-3-one, N-phenylpentanamid-3-one, N,N-dimethylpentanamid-3-one, N,N-diethylpentanamide-3-one, N,N-dioctylpentanamid-3-one, N,N-diphenylpentanamid-3-one, N-methylhexanamid-3-one, N-ethylhexanamid-3-one, N-propylhexanamid-3-one, N-octylhexanamid-3-one, N-phenylhexanamid-3-one, N,N-dimethylhexanamid-3-one, N,N-diethylhexanamid-3-one, N,N-dipropylhexanamid-3-one, N,N-dioctylhexanamid-3-one, N,N-diphenylhexanamid-3-one, N-methylheptanamid-3-one, N-ethylheptanamid-3-one, N-propylheptanamid-3-one, N-octylheptanamid-3-one, N-phenylheptanamid-3-one, N,N-dimethylheptanamid-3-one, N,N-diethylheptanamid-3-one, N,N-dipropylheptanamid-3-one, N,N-dioctylheptanamid-3-one, N,N-diphenylheptanamid-3-one, N-methyl-3-phenylpropanamid-3-one, N-ethyl-3-phenylpropanamid-3-one, N-propyl-3-phenylpropanamid-3-one, N,N-dimethyl-3-phenylpropanamid-3-one, N,N-diethyl-3-phenylpropanamid-3-one, N,N-dipropyl-3-phenylpropanamid-3-one, N-methyl-2-methylbutanamid-3-one, N,N-dimethyl-2-methylbutanamid-3-one, and the like.

Examples of the compound of the general formula (X) are, for instance, malononitrile, methylmalononitrile, ethylmalononitrile, propylmalononitrile, octylmalononitrile, phenylmalononitrile, and the like.

In the above compounds, there are preferably used acetylacetone, methyl acetoacetate, ethyl acetoacetate, acetoacetanilide, malononitrile and an admixture thereof.

The polyamide acid composition of the present invention employing novel chemical treating agents has an excellent stability at normal temperature in a form of solution rather than the polyamide acid composition employing conventional chemical treating agents and provides an appropriate pot life. The composition, when heated, can also raise the rate of the conversion to the imides as much as the conventional polyamide acid composition as described hereinafter.

A preferable polyamide acid usable in the present invention which is a precursor of the polyimide has a repeated unit of the formula (XIV):

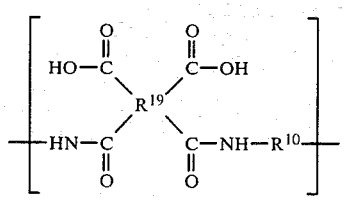

(XIV)

wherein $R^{10}$ is a phenylene group, a naphtalene group, a biphenylene group or a bivalent aromatic group of the formula (XII):

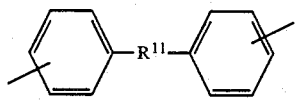

(XII)

in which $R^{11}$ is an alkylene group having 1 to 4 carbon atoms,

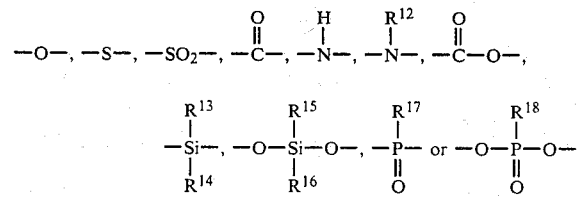

in which $R^{12}$, $R^{13}$, $R^{14}$, $R^{15}$ $R^{16}$, $R^{17}$ and $R^{18}$ are an aliphatic group or an aromatic group, and $R^{19}$ is

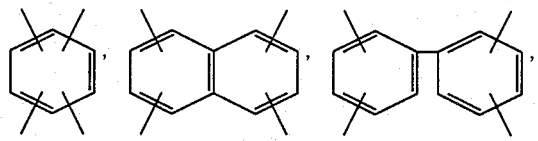

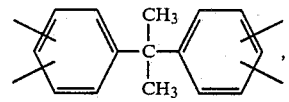

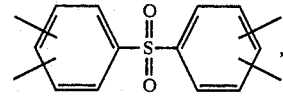

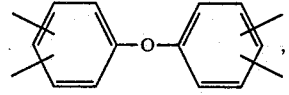

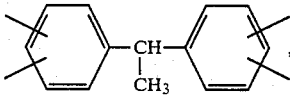

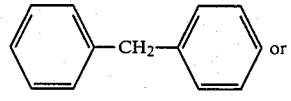

or

-continued

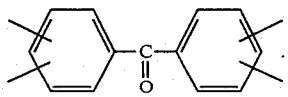

The preferable polyamide acids can be prepared by reacting an aromatic diamine of the formula (XI):

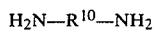

wherein $R^{10}$ is defined as above with an aromatic tetracarboxylic dianhydride of the formula (XIII):

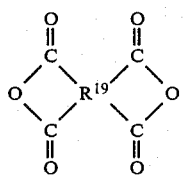

wherein $R^{19}$ is defined as above.

The inherent viscosity of the preferable polyamide acid is in a range of 0.3 to 5.0. The inherent viscosity can be calculated by inserting a value of a viscosity of a 0.5% solution and a value of a viscosity of a solvent which are measured at 30° C. into the following equation:

$$\text{Inherent viscosity} = \frac{\ln\left(\frac{\text{Solution viscosity}}{\text{Solvent viscosity}}\right)}{\text{Concentration (g/100 ml)}}$$

Examples of the aromatic diamine of the formula (XI) are, for instance, m-phenylenediamine, p-phenylenediamine, 4,4'-diaminodiphenylpropane, 4,4'-diaminodiphenylmethane, benzidine, 4,4'-diaminodiphenylsulfide, 4,4'-diaminodiphenylsulfone, 3,3'-diaminodiphenylsulfone, 4,4'-diaminodiphenylether, 2,6-diaminopyridine, bis(4-aminophenyl)diethylsilane, bis(4-aminophenyl)diphenylsilane, 3,3'-dichlorobenzidine, bis(4-aminophenyl)ethylphosphineoxide, bis(4-aminophenyl)phenylphosphineoxide, bis(4-aminophenyl)-N-phenylamine, bis(4-aminophenyl)-N-methylamine, 1,5-diaminonaphthalene, 3,3'-dimethyl-4,4'-diaminodiphenyl, 3,3'-dimethoxybenzidine, an admixture thereof, and the like. Preferable examples of the diamine are 4,4'-diaminodiphenylpropane, 4,4'-diaminodiphenylmethane, 4,4'-diaminodiphenylether and an admixture thereof.

Examples of the aromatic tetracarboxylic dianhydride of the formula (XIII) are, for instance, pyromellitic dianhydride, 2,3,6,7-naphthalene tetracarboxylic dianhydride, 3,3',4,4'-diphenyltetracarboxylic dianhydride, 1,2,5,6-naphthalene tetracarboxylic dianhydride, 2,2',3,3'-diphenyltetracarboxylic dianhydride, 2,2-bis(3,4-dicarboxyphenyl)propane dianhydride, bis(3,4-dicarboxyphenyl)sulfone dianhydride, 3,4,9,10-perylene tetracarboxylic dianhydride, bis(3,4-dicarboxyphenyl)ether dianhydride, 1,2,4,5-naphthalene tetracarboxylic dianhydride, 1,4,5,8-naphthalene tetracarboxylic dianhydride, 2,2-bis(2,3-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, bis(3,4-dicarboxyphenyl)sulfone dianhydride, benzene-1,2,3,4-tetracarboxylic dianhydride, 3,4,3',4'-benzophenone tetracarboxylic dianhydride, an admixture thereof, and the like. Preferable examples are pyromellitic dianhydride, 3,3'4,4'-diphenyltetracarboxylic dianhydride, benzene-1,2,3,4-tetracarboxylic dianhydride and an admixture thereof.

The polyamide acid used in the present invention as the precursor of the polyimide is not necessarily constructed completely by the amide acid units, but may partially include imide units, provided that the polyamide acid solution is prepared in a form of a homogeneous solution. Consequently, the polyamide acid varnish which is modified, for instance, by bismaleimides described in Japanese Unexamined Patent Publication (Tokkyo Kokai) No. 161457/1981 is included in the polyamide acid usable in the present invention.

As the organic solvent used in the present invention, the known solvents for the polyamide acid can be employed. Examples of such solvent are, for instance, N,N-dimethylformamide, N,N-dimethylacetamide, N,N-diethylformamide, N,N-diethylacetamide, N,N-dimethylmethoxyacetamide, dimethylsulfoxide, hexamethylphosphorusamide, N-methyl-2-pyrrolidone, dimethyl sulfone, tetramethylsulfone, an admixture thereof, and the like.

In addition, a mixed solvent of the above-mentioned solvent and a non-solvent for the polyamide such as benzene, toluene, xylene, benzonitrile, dioxane or cyclohexane may be employed.

The polyamide acid solution can be prepared by a usual process under general conditions. The polyamide acid having a usual inherent viscosity, and a usual ratio of the amide acid unit and the imide unit, if any, can be employed.

The polyamide acid composition of the present invention is a composition which includes only the N-substituted heterocyclic compound of the formula (I) in the polyamide acid solution. The hydrating agents can also be added, provided that the stability of the composition in a form of a solution and the appropriate pot life are maintained.

Examples of the dehydrating agent used in the present invention are, for instance, an aliphatic acid anhydride, an aromatic acid anhydride, an N,N'-dialkylcarbodiimide, a lower fatty acid halide, a halogenated lower fatty acid halide, a halogenated lower fatty acid anhydride, arylphosphonic acid dihalide, thionyl halide and an admixture thereof. Preferable examples are a fatty acid anhydride such as acetic anhydride, propionic anhydride, butyric anhydride, and an admixture thereof.

The conversion of the polyamide acid to the polyimide can be determined by infrared absorption spectroscopy. Absorptions assigned to the amide acid group at 1310 cm$^{-1}$ and 3230 cm$^{-1}$ disappear and absorptions assigned to the imide group at 720 cm$^{-1}$ and 815 cm$^{-1}$ increase in proportion to the formation of the imide group. The degree of the conversion and the rate of the conversion can be measured by tracing the disappearance of the absorptions.

As a result of such tracing, the rate of the conversion of the polyamide acid to the polyimide in the composition of the present invention is extremely lowered near the normal temperature in comparison with that in the polyamide acid composition including the chemical treating agent. However, the rate of the conversion drastically increases in proportion to temperature elevation, and becomes as high as the rate of the polyamide acid composition including the chemical treating agent. In a conventional process in which the rate of the conversion is controlled by selecting the amounts of the chemical treating agent, however, the rate of the conversion remains low at an elevated temperature even if the desired pot life can be obtained at an operating temperature, which causes decrease of the producibility. When the polyamide acid composition of the present invention is employed, both the producibility and the characteristic properties of the obtained polyimide are not lowered because the rate of the conversion, as mentioned above, drastically increases by heating.

Although the mechanism to exhibit such effect is not yet comfirmed, it is considered that the N-substituted heterocyclic compound of the formula (I) releases the substituent so as to generate an N-substituted heterocyclic unsaturated compound in proportion to temperature elevation, and the substituent acts as a dehydrating agent and the unsaturated compound acts as a catalyst. This is presumed by the fact that absorptions assigned to isoquinoline are found in the infrared absorption spectrum of the pyrolyzed isoquinoline derivative of the formula (II).

Proportions of the chemical treating agent in the composition of the present invention vary depending on a molding manner and conditions. In a preferable embodiment, the polyamide acid solution contains 1 to 30 % by weight, preferably 5 to 20% by weight of solid content. A preferable amount of the N-substituted heterocyclic compound of the formula (I) is, on the basis of the repeated unit of the formula (XIV) of the polyamide acid, 0.05 to 10 moles, particularly 0.1 to 6 moles. In case that the dehydrating agent is added in the composition, a preferable amount of the dehydrating agent plus the N-substituted heterocyclic compound is, on the basis of the repeated unit of the formula (XIV) of the polyamide acid, 0.05 to 10 moles, particularly 0.1 to 6 moles.

In order to extend the pot life, the chemical treating agent should be added in an amount of a limited range, that is 0.05 to 10 moles, as described above.

When the chemical treating agent is added in more than 10 moles, the pot life extending effect corresponding to the added amount of the agent cannot be obtained. On the other hand, when the chemical treating agent is added in less than 0.05 mole of the chemical treating agent, the rate of the conversion becomes too much lowered to result in the decrease of producibility.

The term "pot life" herein is a period from the time when the chemical treating agent is added to the polyamide acid solution to the time when the viscosity of the polyamide acid compostion drastically increases. The increase of viscosity with the passage of time is measured at a constant temperature. At the time when the viscosity drastically increases, the polyamide acid composition cannot be molded any longer because the gelation of the polyamide acid occurs.

From the polyamide acid composition of the present invention, the polyimide can be molded in various conventional manners depending on the molding process or apparatus. Preferably the polyimide is produced by preparing the polyamide acid composition of the present invention, for example, at about room temperature, elevating the temperature, for example, up to 60° to 120° C., and then converting into the polyimide. A film can be formed by extruding from a slit in an extruder or by applying by means of a bar coater. A filament can be formed by extruding from a nozzle, and a casting product can be formed by casting in a mold. If necessary, the molded product may be heated to accelerate the evaporation of the solvent in the product and the completion of the conversion of the polyamide acid to the polyimide.

In general, in case where a molding material which can be easily cured is subjected to a continuous molding operation for a long time, it is very important to reduce a period for staying of the molding material at inner surfaces of a molding apparatus and a tube so as to be the minimum, and to extend the pot life of the material. Such conditions can be obtained by employing a molding material having a low viscosity and the long pot life. As to the polyamide acid solution, since the polyamide acid solution has essentially a high viscosity, the polyamide acid solution is heated in order to decrease the viscosity of the solution. In that case, however, there is a problem that the pot life is shortened.

In case of employing the polyamide acid composition of the present invention, a long term continuous molding operation can be carried out at a higher temperature than the conventional molding operation while maintaining the composition in a low viscosity because the pot life of the polyamide acid composition is extended.

The restriction in the operation of feeding the polyamide acid composition under pressure through a tube can be reduced because the polyamide acid composition can be operated in a low viscosity.

Furthermore, since the polyamide acid composition can be operated at a higher temperature than the conventional manner, no cooling or slightly cooling is necessary for the treatment of the polyamide acid composition. Accordingly, facilities such as a cooling apparatus can be saved.

In general, the pot life is shortened in proportion to the increase of a concentration of the polyamide acid solution. However, in case of employing the compositions of the present invention including the pot life extending agent, the polyamide acid solution of a higher concentration can be employed. As a result, the amount of the solvent can be reduced, and then the cost of preparation of the polyimide can be saved.

The present invention is described and explained by means of the following Reference Examples, Examples and Comparative Examples. It is to be understood that the present invention is not limited to the Reference Examples, Examples and Comparative Examples and various changes and modifications may be made in the invention without departing from the spirit and scope thereof.

Reference Example 1

[Preparation of a polyamide acid solution]

Into 70 g of N,N-dimethylacetamide was dissolved 6.06 g (0.0303 mole) of 4,4'-diaminodiphenylether. To the obtained mixture was gradually added 6.605 g (0.0303 mole) of pure pyromellitic dianhydride while keeping the reaction vessel at 40° C.

As a result of further stirring for one hour after adding pyromellitic acid dianhydride, a polyamide acid solution as a precursor of polyimide was obtained. The solution had a concentration of 15.32% by weight as a solid and an inherent viscosity of 2.0.

Reference Example 2

[Preparation of a polyamide acid solution]

The procedure of Reference Example 1 was repeated except that N,N-dimethylformamide was employed instead of N,N-dimethylacetamide. The obtained solution had a concentration of 15.32% by weight as a solid and an inherent viscosity of 1.5.

Reference Example 3

[Preparation of a polyamide acid solution]

The procedure of Reference Example 1 was repeated except that N-methyl-2-pyrrolidone was employed instead of N,N-dimethylacetamide. The obtained solution had concentration of 15.32% by weight as a solid and an inherent viscosity of 2.1.

Reference Example 4

[Preparation of a polyamide acid solution]

The procedure of Reference Example 1 was repeated except that 6.00 g (0.0303 mole) of 4,4'-diaminodiphenylmethane was employed instead of 4,4'-diaminodiphenylether. The obtained solution had a concentration of 15.26% by weight as a solid and an inherent viscosity of 1.8.

Reference Example 5

[Preparation of an isoquinoline derivative of the general formula (II), wherein $X=Y=-COCH_3$, $R^1=-CH_3$ and $R^2=R^3=H$]

Into 10 g (0.1 mole) of acetic anhydride was dissolved 5.00 g (0.05 mole) of acetylacetone. To the obtained mixture was gradually added 2.58 g (0.02 mole) of isoquinoline while keeping the reaction vessel below 15° C. The reaction mixture was further stirred for one hour from the moment that the addition of isoquinoline was completed. Then, the excess acetic anhydride and acetylacetone were evaporated under reduced pressure below 30° C. 4.05 g (yield: 75%) of an isoquinoline derivative was obtained by cooling the obtained mixture below 5° C. and filtering the precipitated crystal.

The results of elementary analysis, infrared absorption spectrum and proton nuclear magnetic resonance spectrum are shown below.

Elementary analysis for $C_{16}H_{17}NO_3$: Found (%): C 71.22, H 6.40, N 5.19, O 17.32; Calcd. (%): C 70.85, H 6,27, N 5.17, O 17.71.

IR spectrum ($cm^{-1}$):
1620 (C=C of 3 and 4 positions of 1.2-dihydroisoquinoline ring),
1670 (C=O bound to N),
1700 (C=O in X and Y).

$^1$H-NMR spectrum (δ value: ppm, solvent: $CDCl_3$):
7.0 to 7.25 (4H, m, H at 5, 6, 7 and 8 positions of isoquinoline ring),
6.5 (2H, 2d overlapped, H at 1 and 3 positions of isoquinoline ring),
6.05 (1H, d, H at 4 position of isoquinoline ring),
4.0 (1H, d, H of $R^2$),
2.25 (3H, s, $CH_3$ in X and Y),
2.10 (3H, s, $-CO-CH_3$ bound to N),
1.70 (3H, s, $CH_3$ in X and Y).

Reference Example 6

[Preparation of an isoquinoline derivative of the general formula (II), wherein $X=-COCH_3$, $Y=-COOCH_3$, $R^1=-CH_3$, $R^2=R^3=H$]

The procedure of Reference Example 5 was repeated except that 5.80 g (0.05 mole) of methyl acetoacetate was employed instead of acetylacetone to give 4.42 g (yield: 77%) of an isoquinoline derivative. The results of elementary analysis, IR spectrum and $^1$H-NMR spectrum are shown below.

Elementary analysis for $C_{16}H_{17}NO_4$: Found (%): C 66.36, H 5.89, N 4.91, O 22.27; Calcd. (%): C 66.90, H 5.92, N 4.88, O 22.30.

IR spectrum ($cm^{-1}$): 1620, 1670, 1700, 1720.

$^1$H—NMR spectrum (δ value: ppm): 7.05 to 7.25 (4H, m), 6.55 (1H, d), 6.4 (1H, d), 6.02 (1H, d), 3.57 (1H, d), 3.47 (3H, s), 2.28 (3H, s), 2.10 (3H, s).

Reference Example 7

[Preparation of an isoquinoline derivative of the general formula (II), wherein $X=-COCH_3$, $Y=-COOC_2H_5$, $R^1=-CH_3$, $R^2=R^3=H$]

The procedure of Reference Example 5 was repeated except that 5.20 g (0.04 mole) of ethyl acetoacetate was employed instead of acetylacetone to give 5.18 g (yield: 86%) of an isoquinoline derivative. The results of elementary analysis, IR spectrum and $^1$H-NMR spectrum are shown below.

Elementary analysis for $C_{17}H_{19}NO_4$: Found (%): C 67.70, H 6.40, N 4.70, O 21.49; Calcd. (%): C 67.78, H 6.31, N 4.65, O 21.26.

IR spectrum ($cm^{-1}$): 1620, 1670, 1700, 1720.

$^1$H-NMR spectrum (δ value: ppm): 7.05 to 7.25 (4H, m), 6.56 (1H, d), 6.4 (1H, d), 6.03 (1H, d), 3.9 (2H, q), 3.55 (1H, d), 2.30 (3H, s), 2.10 (3H, s), 1.03 (3H, t).

Reference Examples 8 and 9

[Preparation of isoquinoline derivatives of the general formula (II), wherein $X=-COCH_3$, $Y=-CONHC_6H_5$, $R^1=-CH_3$, $R^2=R^3=H$ (Reference Example 8) and $X=Y=-CN$, $R^1=-CH_3$, $R^2=R^3=H$ (Reference Example 9)]

The procedure of Reference Example 5 was repeated except that 0.04 mole of acetoacetic anilide (Reference Example 8) or 0.04 mole of malononitrile (Reference Example 9) was employed instead of acetylacetone to give a corresponding isoquinoline derivative with yield of 85%, 65%, respectively. The structures of the obtained isoquinoline derivatives were identified by means of elementary analysis, IR spectrum and $^1$H-NMR spectrum.

Example 1

To 50 g of polyamide acid solution obtained in Reference Example 1 was added and mixed 15.25 g of isoquinoline derivative to give a polyamide acid composition of the present invention.

The pot life of the obtained composition was 160 min at 23° C. and 750 min at 4° C.

The obtained polyamide acid composition was applied with a bar coater on an aluminum foil of 30 μm in thickness to give a polyamide acid coating membrane of about 300 μm in thickness, and was heated in an oven at 100° C. for a few minutes until the polyamide acid composition was converted to a selfsupporting gell. The gelled coating membrane was peeled from the aluminum foil and fixed with frames on all sides, and was heated at 150° C. for 10 min, and at 300° C. for 30 min to give a tough polyimide film.

Example 2

To 50 g of polyamide acid solution obtained in Reference Example 1 were added and mixed 7.47 g of acetic anhydride and 1.51 g of isoquinoline derivative obtained in Reference Example 5 to give a polyamide acid composition of the present invention.

The pot life of the obtained composition was 33 min at 23° C. and 550 min at 4° C.

A polyimide film was formed from the composition in the same manner as in Example 1. The obtained polyimide film had a tensile strength of 20 kg/mm² and a tensile elongation of 78%.

Comparative Example 1

The procedure of Example 2 was repeated except that 1.18 g of isoquinoline was employed instead of isoquinoline derivative to give a comparative polyamide acid composition.

The pot life of the obtained composition was 12 min at 23° C. and 100 min at 4° C.

A polyimide film obtained from the composition had a tensile strength of 20 kg/mm² and a tensile elongation of 74%.

Examples 3 to 6

The procedure of Example 2 was repeated except that isoquinoline derivative obtained in Reference Example 6, 7 or 9 was employed instead of that obtained in Reference Example 5 in an amount of 1.60 g, 1.88 g, 2.44 g or 1.36 g, respectively, to give a polyamide acid composition of the present invention.

The pot life of the obtained compositions is in the range of 35 to 45 min.

A polyimide film formed from each composition had a toughness and an excellent tensile property.

Example 7 and Comparative Example 2

The procedure of Example 2 was repeated except that polyamide acid solution obtained in Reference Example 2 was employed instead of that obtained in Reference Example 1 to give a polyamide acid composition of the present invention.

The pot life of the obtained polyamide acid composition was 27 min at 23° C., and a polyimide film formed from the composition had a tensile strength of 19 kg/mm² and a tensile elongation of 72%.

On the other hand, a comparative polyamide acid composition was obtained from the polyamide acid solution obtained in Reference Example 2 in the same manner as in Reference Example 1. The pot life of the obtained comparative composition was 11 min at 23° C., and a polyimide film formed from the composition had a tensile strength of 20 kg/mm² and a tensile elongation of 72%.

Example 8 and Comparative Example 3

The procedure of Example 2 was repeated except that polyamide acid solution obtained in Reference Example 3 was employed instead of that obtained in Reference Example 1 to give a polyamide acid composition of the present invention.

On the other hand, a comparative polyamide acid composition was obtained from the polyamide acid solution obtained in Reference Example 3 in the same manner as in Reference Example 1.

The pot life at 23° C. of the polyamide acid composition of the present invention was about three times that of the comparative composition, and there was not observed an substantial difference in the property between the polyimide films formed from the respective compositions.

Example 9 and Comparative Example 4

The procedure of Example 2 was repeated except that polyamide acid solution obtained in Reference Example 4 was employed instead of that obtained in Reference Example 1 to give a polyamide acid composition of the present invention.

On the other hand, a comparative polyamide acid composition was obtained from the polyamide acid solution obtained in reference Example 4 in the same manner as in Reference Example 1.

The pot life at 23° C. of the polyamide acid composition of the present invention was about two and a half times that of the comparative composition, and there was not observed an substantial difference in the property between the polyimide films formed from the respective compositions.

Comparative Example 5

To 50 g of polyamide acid solution obtained in Reference Example 1 were added and mixed 4.25 g of acetic anhydride and 0.24 g of isoquinoline to give a comparative polyamide acid composition. The pot life of the obtained polyamide acid composition was 35 min at 23° C. A tough polyimide film could not be formed from the comparative composition in the same manner as in Example 1 because a gelled coating membrane could not be peeled from the aluminum foil.

What we claim is:

1. A polyamide acid composition for preparing a polyimide comprising a solution of a polyamide acid in an organic solvent which is a precursor of the polyimide and an N-substituted heterocyclic compound of the formula (I):

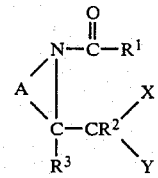

wherein A is a resisue of a N-heterocyclic ring containing only nitrogen and carbon atoms; X is a member selected from the group consisting of

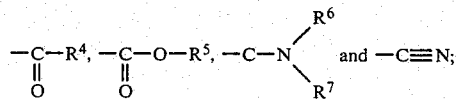

Y is a member selected from the group consisting of

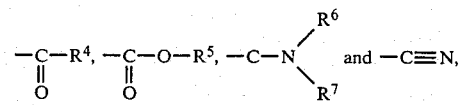

hydrogen, an aliphatic group having 1 to 12 carbon atoms and an aromatic group; and $R^1$, $R^2$, $R^3$, $R^4$, $R^5$, $R^6$ and $R^7$ are the same or different and each is hydrogen atom, an aliphatic group having 1 to 12 carbon atoms or an aromatic group.

2. The composition of claim 1, wherein said N-substituted heterocyclic compound is an isoquinoline derivative of the formula (II):

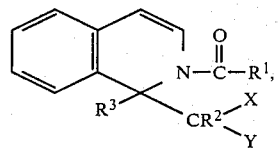

wherein X, Y, $R^1$, $R^2$ and $R^3$ are as defined above.

3. The composition of claim 1, wherein the N-substituted heterocyclic compound is contained in an amount of 0.05 to 10 moles on the basis of a repeating unit of the polyamide acid.

* * * * *